US011810728B2

(12) United States Patent
Tani et al.

(10) Patent No.: US 11,810,728 B2
(45) Date of Patent: Nov. 7, 2023

(54) ELECTROLYTIC CAPACITOR

(71) Applicant: Murata Manufacturing Co., Ltd., Nagaokakyo (JP)

(72) Inventors: Satoshi Tani, Nagaokakyo (JP); Yoshiyuki Nomura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 111 days.

(21) Appl. No.: 17/464,995

(22) Filed: Sep. 2, 2021

(65) Prior Publication Data

US 2021/0398751 A1 Dec. 23, 2021

Related U.S. Application Data

(63) Continuation of application No. PCT/JP2019/048405, filed on Dec. 11, 2019.

(30) Foreign Application Priority Data

Mar. 5, 2019 (JP) .................................. 2019-039674

(51) Int. Cl.
| | | |
|---|---|---|
| *H01G 9/10* | (2006.01) | |
| *H01G 9/15* | (2006.01) | |
| *H01G 9/00* | (2006.01) | |
| *H01G 9/26* | (2006.01) | |

(52) U.S. Cl.
CPC .................. *H01G 9/10* (2013.01); *H01G 9/15* (2013.01); *H01G 9/0029* (2013.01); *H01G 9/26* (2013.01)

(58) Field of Classification Search
CPC .................................. H01G 9/012; H01G 9/15
See application file for complete search history.

(56) References Cited

U.S. PATENT DOCUMENTS

| | | | | |
|---|---|---|---|---|
| 4,001,655 | A * | 1/1977 | Voyles ..................... | H01G 2/12 |
| | | | | 361/534 |
| 6,845,004 | B2 * | 1/2005 | Melody .................. | H01G 9/012 |
| | | | | 257/E23.056 |
| 2010/0166977 | A1 * | 7/2010 | Brand et al. ......... | C09D 183/16 |
| | | | | 427/515 |
| 2010/0246100 | A1 * | 9/2010 | Umemoto ................ | H01G 9/15 |
| | | | | 361/535 |

(Continued)

FOREIGN PATENT DOCUMENTS

| | | |
|---|---|---|
| CN | 103842174 A | 6/2014 |
| JP | S62179532 A | 8/1987 |

(Continued)

OTHER PUBLICATIONS

International Search Report for PCT/JP2019/048405, dated Feb. 25, 2020.

(Continued)

*Primary Examiner* — Eric W Thomas
(74) *Attorney, Agent, or Firm* — ArentFox Schiff LLP

(57) ABSTRACT

An electrolytic capacitor that includes a capacitor element including an anode portion made of a metal layer, a dielectric layer on an outer surface of the metal layer, and a cathode portion on an outer surface of the dielectric layer; an insulating resin body covering the capacitor element; and a gas barrier film on an outer surface of the insulating resin body, the gas barrier film having a water vapor transmittance of 1 g/m² per day or less.

13 Claims, 4 Drawing Sheets

(56) References Cited

U.S. PATENT DOCUMENTS

| | | | |
|---|---|---|---|
| 2012/0204389 A1* | 8/2012 | Ibata | H01G 9/012 29/25.42 |
| 2014/0170431 A1 | 6/2014 | Kenmochi et al. | |
| 2014/0285951 A1* | 9/2014 | Otani | H01G 9/012 29/25.03 |
| 2015/0049419 A1* | 2/2015 | Biler | H01G 9/012 361/536 |
| 2015/0092319 A1 | 4/2015 | Tatsuno et al. | |
| 2017/0110256 A1* | 4/2017 | Lin | H01G 9/012 |
| 2019/0006116 A1* | 1/2019 | Petrzilek | H01G 9/10 |
| 2019/0287731 A1 | 9/2019 | Kurihara et al. | |
| 2020/0176192 A1* | 6/2020 | Yamada | H01G 9/012 |

FOREIGN PATENT DOCUMENTS

| | | | |
|---|---|---|---|
| JP | 2005072399 A | 3/2005 | |
| JP | 2015073097 A | 4/2015 | |
| WO | 2008126181 A1 | 10/2008 | |
| WO | 2018123491 A1 | 7/2018 | |

OTHER PUBLICATIONS

Written Opinion of the International Searching Authority issued for PCT/JP2019/048405, dated Feb. 25, 2020.

* cited by examiner

ELECTROLYTIC CAPACITOR

CROSS REFERENCE TO RELATED APPLICATIONS

The present application is a continuation of International application No. PCT/JP2019/048405, filed Dec. 11, 2019, which claims priority to Japanese Patent Application No. 2019-039674, filed Mar. 5, 2019, the entire contents of each of which are incorporated herein by reference.

FIELD OF THE INVENTION

The present invention relates to an electrolytic capacitor.

BACKGROUND OF THE INVENTION

An electrolytic capacitor such as a solid electrolytic capacitor includes a capacitor element including an anode portion made of a metal layer, a dielectric layer on an outer surface of the metal layer, and a cathode portion on an outer surface of the dielectric layer. In such an electrolytic capacitor, usually, the capacitor element is sealed with a sealing material mainly containing a thermosetting resin such as an epoxy resin in order to protect the capacitor element.

For example, Patent Literature 1 discloses an aluminum electrolytic capacitor device obtained by sealing and molding an aluminum electrolytic capacitor element with an epoxy resin sealing material. In the aluminum electrolytic capacitor device, the sealing material contains an epoxy resin composition and an inorganic filler such that the amount of the inorganic filler accounts for at least 73 wt % of the entire sealing material; at least 40% of the inorganic filler is a filler X having a coefficient of linear expansion of $0.2 \times 10^{-5}$ to $0.9 \times 10^{-5}$ (/° C.); and the sealing material after the resin has cured has a coefficient of linear expansion of $2.0 \times 10^{-5}$ to $3.0 \times 10^{-5}$ (/° C.).

Patent Literature 2 discloses a solid electrolytic capacitor including: a capacitor element including a sintered porous anode body, a dielectric covering the anode body, a solid electrolyte covering the dielectric, and a moisture barrier layer covering the solid electrolyte; an anode terminal electrically connected to the anode body; a cathode terminal electrically connected to the solid electrolyte; and a resin casing enclosing the capacitor element, with at least a part of the anode terminal and the cathode terminal being exposed. In the solid electrolytic capacitor described above, the solid electrolyte contains a conductive polymer and an organometallic coupling agent containing an organic chain having at least one reactive group bonded to a metal atom, and the moisture barrier layer includes a hydrophobic elastomer.

Patent Literature 1: JP 2005-72399 A
Patent Literature 2: JP 2015-73097 A

SUMMARY OF THE INVENTION

According to Patent Literature 1, increasing the ratio of the inorganic filler in the sealing material can reduce the moisture absorbency, thus resulting in higher moisture resistance reliability. However, while it is possible to reduce the moisture transmission rate, it is difficult to ensure sufficient moisture resistance reliability for a long time.

According to Patent Literature 2, covering the solid electrolyte with the moisture barrier layer containing a hydrophobic elastomer can provide excellent electrical characteristics even in hot and humid conditions. However, such a structure in which the capacitor element is covered with the moisture barrier layer fails to achieve a sufficient effect of improving the moisture resistance reliability, and may result in higher equivalent series resistance (ESR).

The present invention was made to solve the above issues, and aims to provide an electrolytic capacitor capable of reducing or preventing moisture absorption into a capacitor element and having excellent moisture resistance reliability.

The electrolytic capacitor of the present invention includes: a capacitor element including an anode portion made of a metal layer, a dielectric layer on an outer surface of the metal layer, and a cathode portion on an outer surface of the dielectric layer; an insulating resin body covering the capacitor element; and a gas barrier film on an outer surface of the insulating resin body, the gas barrier film having a water vapor transmittance of 1 $g/m^2$ per day or less.

The present invention provides an electrolytic capacitor capable of reducing or preventing moisture absorption into a capacitor element and having excellent moisture resistance reliability.

DETAILED DESCRIPTION OF THE PREFERRED EMBODIMENTS

The electrolytic capacitor of the present invention is described below.

The present invention is not limited to the following preferred embodiments, and may be suitably modified without departing from the gist of the present invention. Combinations of two or more preferred features described in the following preferred features are also within the scope of the present invention.

An embodiment of the electrolytic capacitor of the present invention is described, using a solid electrolytic capacitor that uses a solid electrolyte as an example. The electrolytic capacitor of the present invention is not limited to a solid electrolytic capacitor, and may be an electrolytic capacitor that uses an electrolytic solution instead of a solid electrolyte, or may be an electrolytic capacitor that uses both a solid electrolyte and an electrolytic solution.

The following embodiments are examples, and features of different embodiments can be partially exchanged or combined with each other. In the second embodiment and subsequent embodiments, a description of features common to the first embodiment is omitted, and only different points are described. In particular, similar effects by similar features are not mentioned in each embodiment.

First Embodiment

Solid Electrolytic Capacitor

A solid electrolytic capacitor according to a first embodiment of the present invention includes a first terminal and a second terminal that externally project from an insulating resin body.

Figure 1:
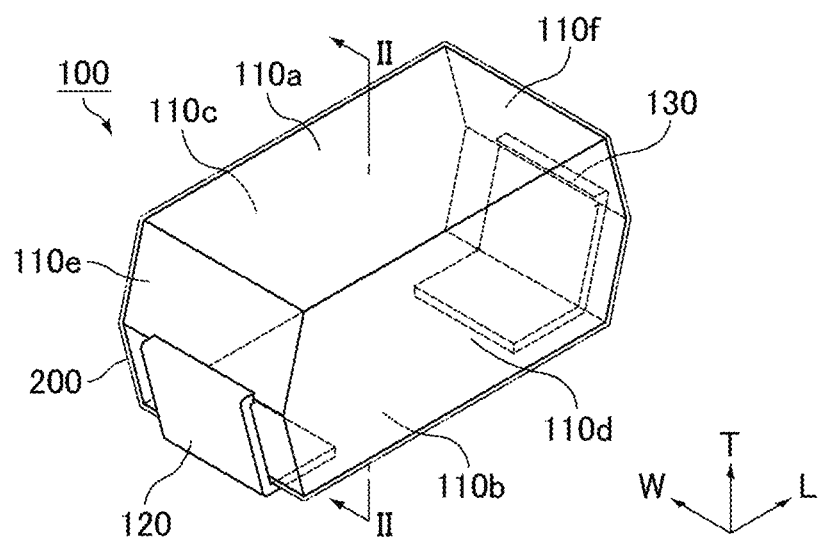
FIG. 1 is a schematic perspective view of an example of a solid electrolytic capacitor according to a first embodiment of the present invention.
Figure 2:
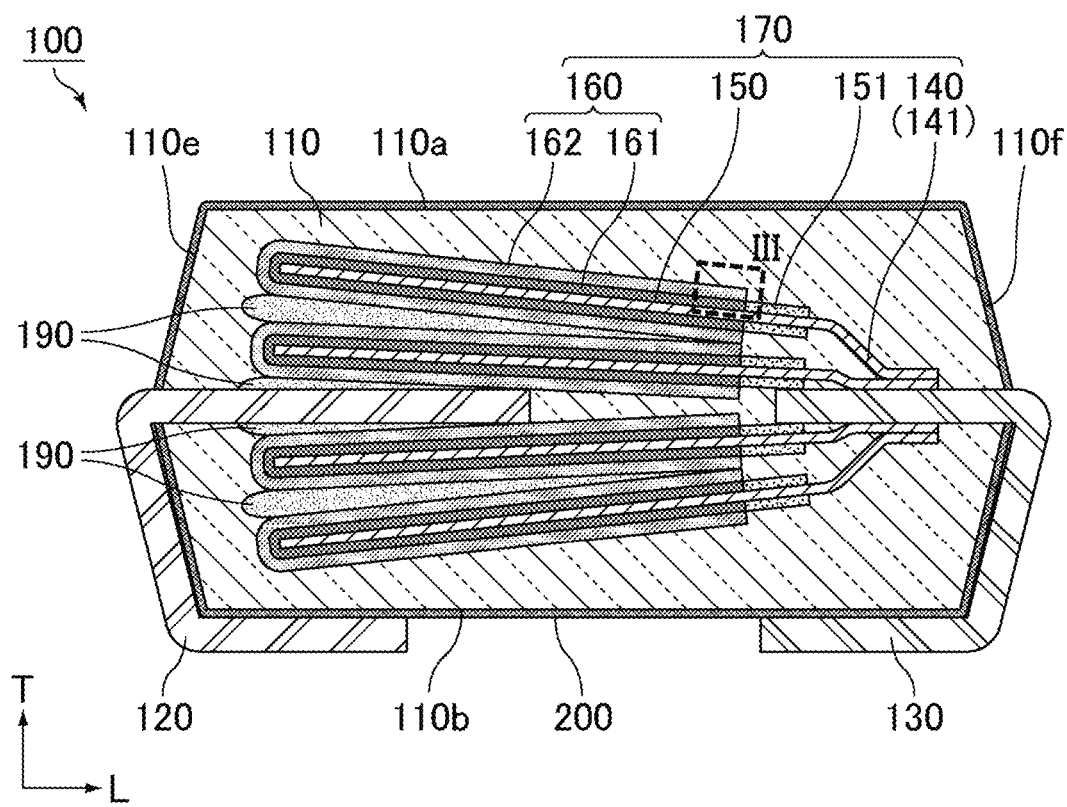
FIG. 2 is a cross-sectional view taken along a line II-II of the solid electrolytic capacitor shown in FIG. 1.
Figure 3:
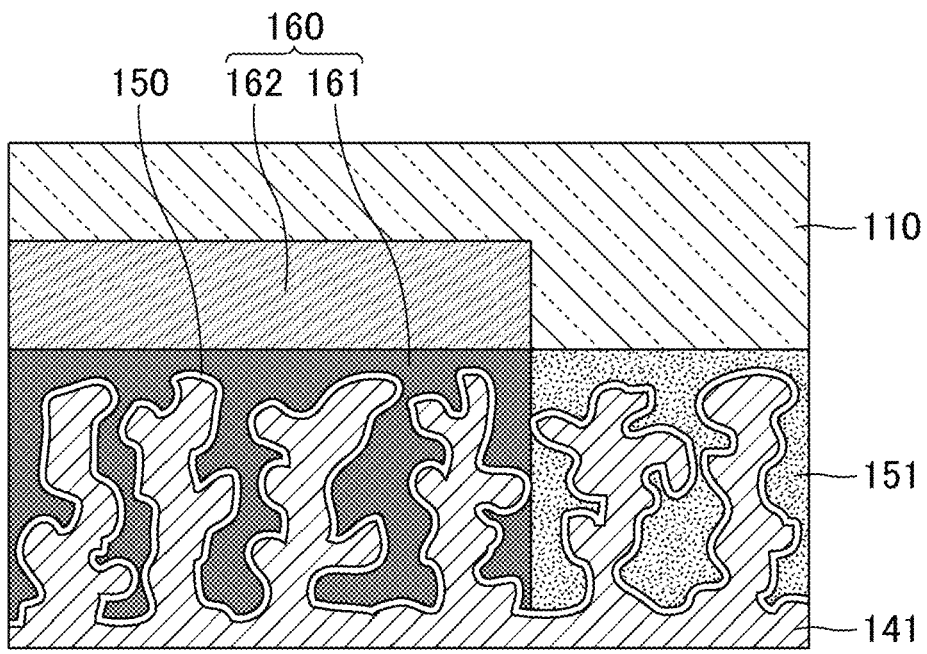
FIG. 3 is an enlarged cross-sectional view of a portion III of the solid electrolytic capacitor shown in FIG. 2.

FIG. 1 is a schematic perspective view of an example of the solid electrolytic capacitor according to the first embodiment of the present invention. FIG. 2 is a cross-sectional view taken along a line II-II of the solid electrolytic capacitor shown in FIG. 1. FIG. 3 is an enlarged cross-sectional view of a portion III of the solid electrolytic capacitor shown in FIG. 2.

In FIG. 1 and FIG. 2, the length direction, width direction, and height direction of the solid electrolytic capacitor and the insulating resin body are indicated by L, W, and T, respectively. Here, the length direction L, the width direction W, and the height direction T are perpendicular to each other.

As shown in FIG. 1 and FIG. 2, a solid electrolytic capacitor 100 has a substantially cuboid outer shape. The external dimensions of the solid electrolytic capacitor 100 are as follows, for example: the length direction L is 7.3 mm; the width direction W is 4.3 mm; and the height direction T is 1.9 mm.

The solid electrolytic capacitor 100 includes multiple capacitor elements 170, an insulating resin body 110, a gas barrier film 200, a first terminal 120, and a second terminal 130.

The insulating resin body 110 has a substantially cuboid outer shape. The multiple capacitor elements 170 are provided in the insulating resin body 110. The insulating resin body 110 includes a first main surface 110a and a second main surface 110b opposite to each other in the height direction T, a first side surface 110c and a second side surface 110d opposite to each other in the width direction W, and a first end surface 110e and a second end surface 110f opposite to each other in the length direction L. Instead of the multiple capacitor elements 170, a single capacitor element 170 may be provided in the insulating resin body 110.

As described above, the insulating resin body 110 has a substantially cuboid outer shape, and its corners and ridges may be rounded. The corner is a portion where three faces of the insulating resin body 110 meet, and the ridge is a portion where two faces of the insulating resin body 110 meet. The insulating resin body 110 may be configured such that at least one of the first main surface 110a, the second main surface 110b, the first side surface 110c, the second side surface 110d, the first end surface 110e, or the second end surface 110f has irregularities formed thereon.

The insulating resin body 110 is made of an insulating resin such as an epoxy resin. Preferably, the insulating resin contains glass or a silicon (Si) oxide as a filler which is dispersedly mixed therein.

The gas barrier film 200 is provided on an outer surface of the insulating resin body 110. The gas barrier film 200 has a water vapor transmittance of 1 $g/m^2$ per day or less.

The gas barrier film 200 having low water vapor transmittance on the outer surface of the insulating resin body 110 can reduce or prevent moisture absorption into the capacitor elements 170 under storage environment or in a moisture resistance test. A large amount of moisture absorption into the capacitor elements 170 may cause a deformation of the insulating resin body 110 or an increase in the internal pressure due to volume expansion from vaporization of the moisture during reflow, possibly resulting in poor leakage current characteristics or cracking in the insulating resin body 110. The gas barrier film 200 can reduce or prevent the above defects caused by moisture absorption, and can drastically improve the moisture resistance reliability.

The water vapor transmission rate ($g/m^2$ per day) of the gas barrier film 200 can be measured by the humidity detection sensor method described in JIS K 7129:2008.

The gas barrier film 200 is made of, for example, diamond-like carbon (DLC), $SiO_2$, $Al_2O_3$, a polysilazane, polysiloxane, or the like. They may be used singly or in multiples.

Preferably, the gas barrier film 200 is provided on the outer surface of the insulating resin body 110, the outer surface being treated with corona discharge.

Treating the outer surface of the insulating resin body 110 with corona discharge (to form a corona discharge treated surface) improves the adhesion between the gas barrier film and an insulating resin such as an epoxy resin. This can reduce or prevent peeling of the gas barrier film during reflow.

Preferably, the gas barrier film 200 is provided on the entire outer surface of the insulating resin body 110, excluding the first terminal 120 and the second terminal 130.

Each of the multiple capacitor elements 170 includes an anode portion 140, a dielectric layer 150, and a cathode portion 160. The multiple capacitor elements 170 are laminated on each other in the height direction T. The multiple capacitor elements 170 are laminated such that one or more of the capacitor elements 170 are laminated on one side of the first terminal 120 and the second terminal 130 in the height direction T, while the other one or ones of the capacitor elements 170 are laminated on the other side of the first terminal 120 and the second terminal 130 in the height direction T.

The anode portion 140 is made of a metal layer 141, for example. As shown in FIG. 3, the metal layer 141 has an outer surface with multiple recesses therein. The outer surface of the metal layer 141 is porous. Since the outer surface of the metal layer 141 is porous, the metal layer 141 has a large surface area. The metal layer 141 is not limited to one whose front and back surfaces are porous. Only one of the front and back surfaces of the metal layer 141 may be porous.

The metal layer 141 has a flat plate shape. The metal layer 141 is made of metal foil, for example. Specifically, the metal layer 141 is made of aluminum foil. The metal layer 141 may not necessarily be made of aluminum, and may be made of a valve-action metal such as an elemental metal (e.g., tantalum, niobium, titanium, zirconium, magnesium, or silicon), an alloy of any of these metals, or an aluminum alloy. The valve-action metal can have an oxide film formed on an outer surface thereof.

The anode portion 140 is not limited as long as it includes a core portion and a porous portion surrounding the core portion. For example, one obtained by etching a rolled metal foil (the metal foil described above) or one obtained by forming a porous sintered fine powder on the rolled metal foil can be suitably employed.

The dielectric layer 150 is provided on the outer surface of the metal layer 141. In the first embodiment, the dielectric layer 150 is made of an oxide film provided on the surface of the valve-action metal, for example. Specifically, the dielectric layer 150 is made of an aluminum oxide. As described later, the aluminum oxide is formed by anodizing the outer surface of the metal layer 141.

The cathode portion 160 is provided on an outer surface of the dielectric layer 150. In FIG. 2 and FIG. 3, the cathode portion 160 includes a solid electrolyte layer 161 and a conductor layer 162.

The solid electrolyte layer 161 is provided on a part of the outer surface of the dielectric layer 150. The solid electrolyte layer 161 is not provided on the outer surface of the dielectric layer 150 on the outer surface of the metal layer 141, adjacent to the second end surface 110f. Of the dielectric layer 150 at this part where the solid electrolyte layer 161 is not provided on the outer surface of the dielectric layer 150, a part adjacent to the part provided with the solid electrolyte layer 161 has an outer surface covered with an insulating layer 151 described later.

As shown in FIG. 3, preferably, the solid electrolyte layer 161 is provided to fill the multiple recesses in the metal layer 141. However, there may be one or more recesses in the metal layer 141, which are not covered with the solid electrolyte layer 161, as long as the above-described part of the outer surface of the dielectric layer 150 is covered with the solid electrolyte layer 161.

Examples of materials of the solid electrolyte layer 161 include conductive polymers such as polypyrroles, polythiophenes, and polyanilines. Of these, polythiophenes are preferred, and poly(3,4-ethylenedioxythiophene) called PEDOT is particularly preferred. The conductive polymers may include dopants such as poly(styrene sulfonate) (PSS).

The solid electrolyte layer 161 is formed by, for example, a method in which a treatment solution containing a monomer such as 3,4-ethylenedioxythiophene is used to form a polymerized film of poly(3,4-ethylenedioxythiophene) or the like on the surface of the dielectric layer 150, or a method in which a dispersion of a polymer such as poly(3,4-ethylenedioxythiophene) is applied to the surface of the dielectric layer 150 and dried. Preferably, first, a solid electrolyte layer for an inner layer filling fine pores (recesses) in the metal layer 141 is formed, and then, a solid electrolyte layer for an external layer covering the entire dielectric layer 150 is formed.

The conductor layer 162 is provided on an outer surface of the solid electrolyte layer 161. The conductor layer 162 may be a carbon layer or a silver layer, for example. Alternatively, the conductor layer 162 may be a composite layer in which a silver layer is provided on an outer surface of a carbon layer, or a mixed layer containing carbon and silver.

As described above, of the dielectric layer 150 at the part not provided with the solid electrolyte layer 161, the part adjacent to the part provided with the solid electrolyte layer 161 has an outer surface covered with the insulating layer 151 whose composition is different from that of the insulating resin body 110.

The insulating layer 151 is formed by applying a masking agent such as a composition containing an insulating resin, for example. Examples of the insulating resin include polyphenylsulfone (PPS), polyethersulfone (PES), a cyanate ester resin, fluororesins (e.g., tetrafluoroethylene and a tetrafluoroethylene-perfluoroalkyl vinyl ether copolymer), compositions containing a soluble polyimide siloxane and an epoxy resin, a polyimide resin, a polyamideimide resin, and derivatives or precursors thereof.

As shown in FIG. 2, preferably, the conductor layers 162 of the capacitor elements 170 adjacent to each other in the lamination direction are electrically connected to each other via a connecting conductor layer 190. The width of the connecting conductor layer 190 in the width direction W is the same as the width of the metal layer 141 in the width direction W, for example. The connecting conductor layer 190 contains silver. The connecting conductor layer 190 is made of a conductive adhesive, for example.

The second end surface 110f-side ends of the metal layers 141 of the capacitor elements 170 adjacent to each other in the lamination direction are electrically connected to each other by resistance welding or the like.

In this case, preferably, an end of the second terminal 130, which is located inside the insulating resin body 110, is plated with a low-melting point metal. Each anode portion 140 at a part where the dielectric layer 150 is exposed from the cathode portion 160 is overlapped on the part plated with a low-melting point metal. The overlapping part of the anode portions 140 is resistance welded. Resistance welding generates heat at the overlapping part of the anode portions 140 due to specific resistance of the dielectric layer 150 adjacent to the second end surface 110f-side end of the anode portion 140. The heat melts the low-melting point metal plated on the second terminal 130, and the second terminal 130 is integrally bonded to the end of each anode portion 140.

When the metal layer 141 is aluminum chemical foil, heat generated from the oxide film that is the dielectric layer 150 melts an aluminum chemical foil surface, and the aluminum chemical foil surfaces at the overlapping part melt into each other and are integrally bonded.

Likewise, the second end surface 110f-side ends of the metal layers 141 of the capacitor elements 170 adjacent to each other in the lamination direction may be electrically connected to each other by another connecting conductor layer electrically insulated from the connecting conductor layer 190. The another connecting conductor layer may be made of a conductive adhesive.

When the multiple capacitor elements 170 are viewed in a cross section parallel to the height direction T and the length direction L as shown in FIG. 2, these capacitor elements 170 are arranged in a fan shape, with edges of the cathode portions 160 being separated from each other in the height direction T. The multiple capacitor elements 170 are arranged such that the further away they are located from a part of the first terminal 120, which is located inside the insulating resin body 110, the more steeply each metal layer 141 at the part where the dielectric layer 150 is covered with the cathode portion 160 is inclined to the part of the first terminal 120.

The first terminal 120 is a lead frame. The first terminal 120 is electrically connected to each cathode portion 160 of the multiple capacitor elements 170, and is led out to the outside of the insulating resin body 110. The part of the first terminal 120, which is located inside the insulating resin body 110, faces each conductor layer 162 of two capacitor elements 170 adjacent to each other in the lamination direction and is connected to each of these conductor layers 162 via the connecting conductor layer 190. The part of the first terminal 120, which is located outside the insulating resin body 110, is bent along the first end surface 110e and the second main surface 110b of the insulating resin body 110.

The second terminal 130 is a lead frame. The second terminal 130 is electrically connected to each anode portion 140 of the multiple capacitor elements 170, and is led out to the outside of the insulating resin body 110. The part of the second terminal 130, which is located inside the insulating resin body 110, is sandwiched between the second end surface 110f-side ends of the metal layers 141 of two capacitor elements 170 adjacent to each other in the lamination direction and is connected to each of these metal layers 141 by resistance welding or the like. The part of the second terminal 130, which is located outside the insulating resin body 110, is bent along the second end surface 110f and the second main surface 110b of the insulating resin body 110.

Method of Producing Solid Electrolytic Capacitor

The solid electrolytic capacitor 100 shown in FIG. 1 is produced as follows, for example.

In producing the solid electrolytic capacitor 100, first, the capacitor element 170 is prepared in step S10. Specifically, the following steps S11 to S14 are performed.

In step S11, the dielectric layer 150 is provided on the outer surface of the metal layer 141. For example, aluminum foil as the metal layer 141 is immersed in an aqueous solution of ammonium adipate for anodization, whereby an aluminum oxide that serves as the dielectric layer 150 is formed. When chemical foil including an aluminum oxide formed thereon is cut and used as the metal layer 141, the metal layer 141 obtained by cutting is immersed again in an aqueous solution of ammonium adipate for anodization in order to form an aluminum oxide on the cut surface.

In step S12, a part of the metal layer 141 is masked. The masking is performed to define a formation area where the solid electrolyte layer 161 is provided in the next step. For example, a masking agent containing an insulating resin such as a polyimide resin or a polyamideimide is applied to a part of the outer surface of the metal layer 141. The masked portion formed in this step becomes the insulating layer 151.

In step S13, the solid electrolyte layer 161 is provided on a part of the outer surface of the dielectric layer 150. For example, a polymerized film is formed by attaching a treatment solution containing 3,4-ethylenedioxythiophene and an oxidant to the outer surface of the dielectric layer 150 located at the formation area of the solid electrolyte layer 161 defined by the masked portion formed in step S12. The treatment solution is a dispersion of a conductive polymer, and the thus-obtained polymerized film becomes the solid electrolyte layer 161. The film may be formed by chemical polymerization.

Next, in step S14, the conductor layer 162 is provided on the outer surface of the solid electrolyte layer 161. For example, carbon is applied to the outer surface of the solid electrolyte layer 161 to form a carbon layer, and then silver is applied to the outer surface of the carbon layer to form a silver layer.

The capacitor element 170 is prepared by the above steps S11 to S14.

Next, in step S20, multiple such capacitor elements 170 are provided inside the insulating resin body 110. Specifically, the following steps S21 and S22 are performed.

In step S21, a first terminal strip that becomes the first terminal 120 and a second terminal strip that becomes the second terminal 130 are linearly arranged with a space therebetween. The first terminal strip and the second terminal strip are not bent yet, and have a plate shape.

In step S22, the multiple capacitor elements 170 are stacked on the first terminal strip and the second terminal strip. Specifically, the multiple capacitor elements 170 are stacked on the first terminal strip and the second terminal strip such that the cathode portion 160-side of each capacitor element 170 is placed at the first terminal strip and that the metal layer 141 at the part where the dielectric layer 150 is exposed from the cathode portion 160 of each capacitor element 170 is placed at the second terminal strip.

At this point, on the cathode portion 160 side, a conductive adhesive that becomes the connecting conductor layer 190 is interposed between the capacitor elements 170 adjacent to each other. Likewise, the conductive adhesive that becomes the connecting conductor layer 190 is interposed between the first terminal strip and its adjacent capacitor elements 170. In this manner, the cathode portions 160 of the multiple capacitor elements 170 are electrically connected to the first terminal strip.

After stacking the multiple capacitor elements 170, one end of each metal layer 141 of the multiple capacitor elements 170 is electrically connected to the second terminal strip and the like by welding or the like.

In step S23, the multiple capacitor elements 170 are molded with an insulating resin such as an epoxy resin. Specifically, the first terminal strip, the second terminal strip, and the capacitor elements 170 are molded such that one end of the first terminal strip, which is opposite to the other end adjacent to the second terminal strip, and one end of the second terminal strip, which is opposite to the other end adjacent to the first terminal strip, are exposed.

More specifically, the first terminal strip, the second terminal strip, and the multiple capacitor elements 170 are placed in a mold such that the one end of the first terminal strip and the one end of the second terminal strip are exposed from the mold. The mold is placed in a chamber.

An insulating resin such as an epoxy resin is injected into the mold. The insulating resin is solidified to form the insulating resin body 110, and the multiple capacitor elements 170 are provided inside the insulating resin body 110.

The mold is released, and the insulating resin body 110 in which the multiple capacitor elements 170 are provided is taken out from the chamber. A part of the first terminal strip, which is externally projecting from the insulating resin body 110, is bent along the first end surface 110e and the second main surface 110b, whereby the first terminal 120 is formed. A part of the second terminal strip, which is externally projecting from the insulating resin body 110, is bent along the second end surface 110f and the second main surface 110b, whereby the second terminal 130 is formed.

Subsequently, in step S30, the gas barrier film 200 having a water vapor transmittance of 1 g/m$^2$ per day or less is formed on the outer surface of the insulating resin body 110. At this point, preferably, the gas barrier film 200 is formed on the entire outer surface of the insulating resin body 110, excluding the first terminal 120 and the second terminal 130.

For example, a gas barrier film made of DLC or SiO$_2$ can be formed by the plasma CVD method. A gas barrier film made of Al$_2$O$_3$ can be formed by the atomic layer deposition method (ALD method). A gas barrier film made of a polysilazane or polysiloxane can be formed by dip coating a resin material, followed by drying and curing.

The solid electrolytic capacitor 100 is produced by the above steps.

Second Embodiment

Solid Electrolytic Capacitor

A solid electrolytic capacitor according to a second embodiment of the present invention is different from that according to the first embodiment in the following points: the first terminal and the second terminal which project externally from the insulating resin body are not provided; and the first external electrode and the second external electrode are provided on the first end surface and the second end surface of the insulating resin body, respectively. The solid electrolytic capacitor having a configuration as described above can have a smaller outer shape.

Figure 4:
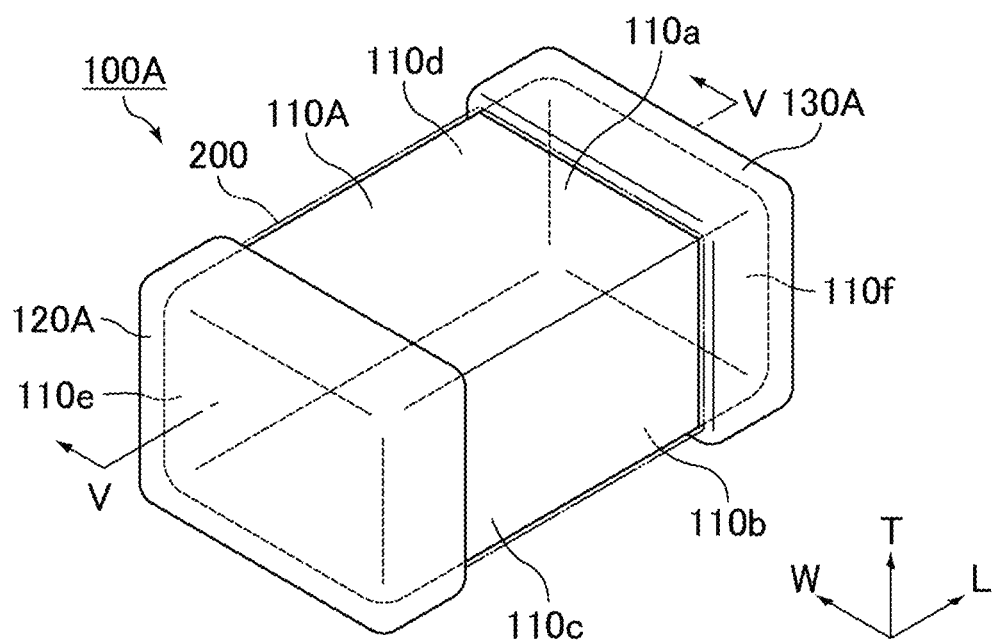
FIG. 4 is a schematic perspective view of an example of a solid electrolytic capacitor according to a second embodiment of the present invention.
Figure 5:
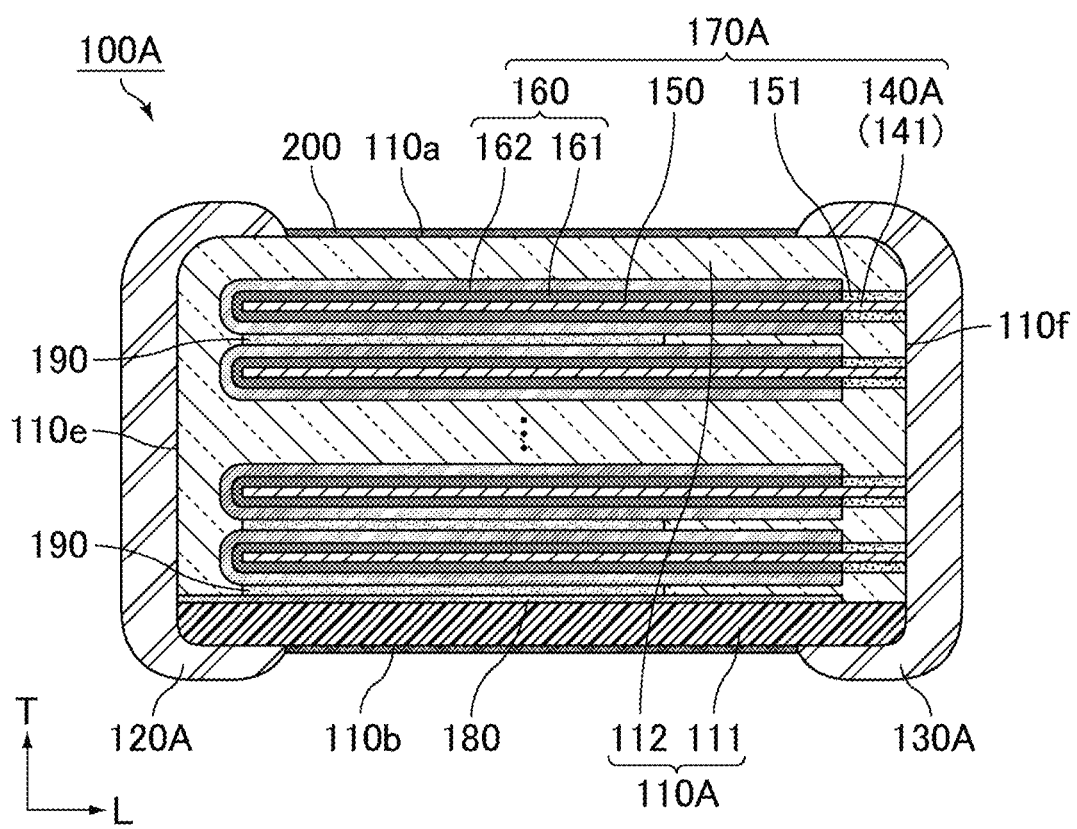
FIG. 5 is a cross-sectional view taken along a line V-V of the solid electrolytic capacitor shown in FIG. 4.

FIG. 4 is a schematic perspective view of an example of the solid electrolytic capacitor according to the second embodiment of the present invention. FIG. 5 is a cross-sectional view taken along a line V-V of the solid electrolytic capacitor shown in FIG. 4.

As shown in FIG. 4 and FIG. 5, a solid electrolytic capacitor 100A has a substantially cuboid outer shape. The external dimensions of the solid electrolytic capacitor 100A are as follows, for example: the length direction L is 3.5 mm; the width direction W is 2.8 mm; and the height direction T is 1.9 mm.

The solid electrolytic capacitor 100A includes multiple capacitor elements 170A, an insulating resin body 110A, the gas barrier film 200, a lead-out conductor layer 180, a first external electrode 120A, and a second external electrode 130A.

The multiple capacitor elements 170A and the lead-out conductor layer 180 are embedded in the insulating resin body 110A. The insulating resin body 110A has a substantially cuboid outer shape. The insulating resin body 110A includes the first main surface 110a and the second main surface 110b opposite to each other in the height direction T, the first side surface 110c and the second side surface 110d opposite to each other in the width direction W, and the first end surface 110e and the second end surface 110f opposite to each other in the length direction L. Instead of the multiple capacitor elements 170A, a single capacitor element 170A may be provided in the insulating resin body 110A.

As described above, the insulating resin body 110A has a substantially cuboid outer shape, and its corners and ridges are preferably rounded. The corner is a portion where three faces of the insulating resin body 110A meet, and the ridge is a portion where two faces of the insulating resin body 110A meet. The insulating resin body 110A may be configured such that at least one of the first main surface 110a, the second main surface 110b, the first side surface 110c, the second side surface 110d, the first end surface 110e, or the second end surface 110f has irregularities formed thereon.

The insulating resin body 110A is made of a substrate 111 and a mold portion 112 provided on the substrate 111.

The substrate 111 is an insulating resin substrate such as a glass epoxy substrate, for example. A bottom surface of the substrate 111 defines the second main surface 110b of the insulating resin body 110A. The thickness of the substrate 111 is 100 μm, for example.

The mold portion 112 is made of an insulating resin such as an epoxy resin. Preferably, the insulating resin contains glass or a Si oxide as a filler which is dispersedly mixed therein. The mold portion 112 is provided on the substrate 111 such that it covers the multiple capacitor elements 170A and the lead-out conductor layer 180.

Preferably, the first end surface 110e and the second end surface 110f of the insulating resin body 110A each include multiple conductive particles. The conductive particles include Pd. The conductive particles act as a catalytic metal that serves as a plating core during formation of the first external electrode 120A and the second external electrode 130A (described later).

The gas barrier film 200 is provided on an outer surface of the insulating resin body 110A. The gas barrier film 200 has a water vapor transmittance of 1 g/m² per day or less.

Preferred water vapor transmission rate, materials, and thickness of the gas barrier film 200 are the same as those of the first embodiment.

Preferably, the gas barrier film 200 is provided on the outer surface of the insulating resin body 110A, the outer surface being treated with corona discharge.

Preferably, the gas barrier film 200 is provided on the outer surface of the insulating resin body 110A, specifically on an area where the first external electrode 120A and the second external electrode 130A are not formed.

The multiple capacitor elements 170A each include the anode portion 140A, the dielectric layer 150, and the cathode portion 160. The dielectric layer 150 and the cathode portion 160 have the same configurations as those in the capacitor element 170.

The anode portion 140A includes the metal layer 141 extending in the length direction L. Preferably, the anode portion 140A further includes a first plating film and a second plating film on the metal layer 141.

Preferably, a second end surface 110f-side end surface of the metal layer 141 is covered with the first plating film. Preferably, the first plating film is covered with the second plating film. In such a case, the first plating film contains Zn, and the second plating film contains Ni. The first plating film and the second plating film may not necessarily be provided.

The insulating layer 151 covers the outer surface of the metal layer 141 from a position adjacent to the part provided with the solid electrolyte layer 161 to the second end surface 110f-side end of the anode portion 140A.

The multiple capacitor elements 170A are laminated on the substrate 111 in the height direction T. The multiple capacitor elements 170A each extend in a direction substantially parallel to the main surfaces of the substrate 111.

In the lamination direction, preferably, the conductor layers 162 of the capacitor elements 170A adjacent to each other are electrically connected to each other via the connecting conductor layer 190. The width of the connecting conductor layer 190 in the width direction W is the same as the width of the metal layer 141 in the width direction W, for example.

The lead-out conductor layer 180 is provided on the substrate 111 that is a part of the insulating resin body 110A. In the insulating resin body 110A, the lead-out conductor layer 180 is located adjacent to the second main surface 110b. The width of the lead-out conductor layer 180 in the width direction W is the same as the width of the metal layer 141 in the width direction W, for example.

The lead-out conductor layer 180 contains Cu, for example. Preferably, a first end surface 110e-side end surface of the lead-out conductor layer 180 is covered with a third plating film. In such a case, the third plating film contains Ni. The third plating film may not necessarily be provided.

The lead-out conductor layer 180 is connected to the conductor layer 162 of one of the multiple capacitor elements 170A. Specifically, the capacitor element 170A at a furthest end in the height direction T and closest to the second main surface 110b is adjacent to the lead-out conductor layer 180. The conductor layer 162 of the only capacitor element 170A adjacent to the lead-out conductor layer 180 is connected to the lead-out conductor layer 180 via the connecting conductor layer 190.

The first external electrode 120A is provided on the first end surface 110e of the insulating resin body 110A. In FIG. 4 and FIG. 5, the first external electrode 120A extends from the first end surface 110e to each of the first main surface 110a, the second main surface 110b, the first side surface 110c, and the second side surface 110d of the insulating resin body 110A. The first external electrode 120A is electrically connected to each cathode portion 160 of the multiple capacitor elements 170A.

The first external electrode 120A is made of at least one plating layer provided on the first end surface 110e of the insulating resin body 110A. For example, the first external electrode 120A includes a Cu plating layer on the first end surface 110e of the insulating resin body 110A, a Ni plating layer on the Cu plating layer, and a Sn plating layer on the Ni plating layer.

The first external electrode 120A is directly or indirectly connected to the lead-out conductor layer 180 at the first end surface 110e of the insulating resin body 110A.

The second external electrode 130A is provided on the second end surface 110f of the insulating resin body 110A. In FIG. 4 and FIG. 5, the second external electrode 130A extends from the second end surface 110f to each of the first main surface 110a, the second main surface 110b, the first side surface 110c, and the second side surface 110d of the insulating resin body 110A. The second external electrode 130A is electrically connected to each anode portion 140A of the multiple capacitor elements 170A.

The second external electrode 130A is made of at least one plating layer provided on the second end surface 110f of the insulating resin body 110A. For example, the second external electrode 130A includes a Cu plating layer on the second end surface 110f of the insulating resin body 110A, a Ni plating layer on the Cu plating layer, and a Sn plating layer on the Ni plating layer.

The second external electrode 130A is directly or indirectly connected to each metal layer 141 of the multiple capacitor elements 170A at the second end surface 110f of the insulating resin body 110A.

Figure 6:
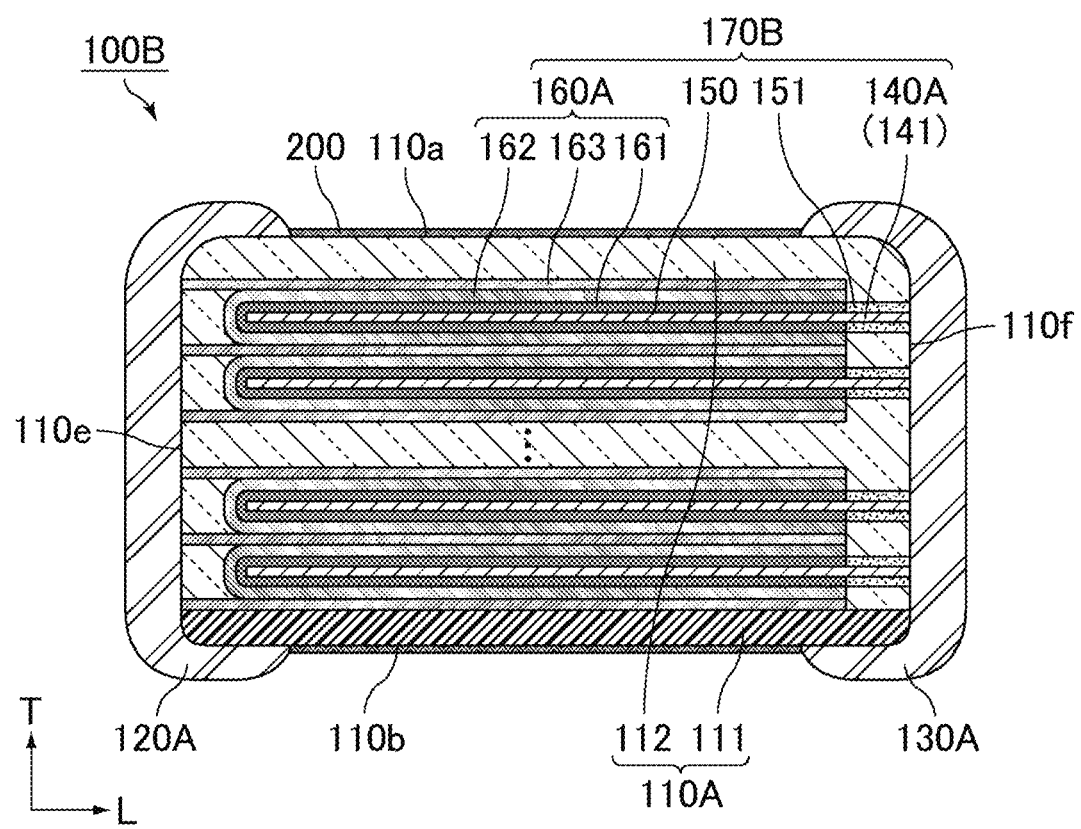
FIG. 6 is a schematic cross-sectional view of another example of the solid electrolytic capacitor according to the second embodiment of the present invention.

FIG. 6 is a schematic cross-sectional view of another example of the solid electrolytic capacitor according to the second embodiment of the present invention.

The solid electrolytic capacitor 100B shown in FIG. 6 includes multiple capacitor elements 170B, the insulating resin body 110A, the gas barrier film 200, the first external electrode 120A, and the second external electrode 130A. The insulating resin body 110A, the gas barrier film 200, the first external electrode 120A, and the second external electrode 130A have the same configurations as those in the solid electrolytic capacitor 100A.

The multiple capacitor elements 170B are embedded in the insulating resin body 110A. Instead of the multiple capacitor elements 170B, a single capacitor element 170B may be provided in the insulating resin body 110A.

The gas barrier film 200 is provided on the outer surface of the insulating resin body 110A. The gas barrier film 200 has a water vapor transmittance of 1 g/m² per day or less.

The multiple capacitor elements 170B are laminated on the substrate 111 in the height direction T. The multiple capacitor elements 170B each extend in a direction substantially parallel to the main surfaces of the substrate 111.

The multiple capacitor elements 170B each include the anode portion 140A, the dielectric layer 150, and the cathode portion 160A. The anode portion 140A and the dielectric layer 150 have the same configurations as those in the capacitor element 170A.

The cathode portion 160A is provided on the outer surface of the dielectric layer 150. In FIG. 6, the cathode portion 160A includes the solid electrolyte layer 161, the conductor layer 162, and a cathode lead-out layer 163. The solid electrolyte layer 161 and the conductor layer 162 have the same configurations as those in the cathode portion 160.

The cathode lead-out layer 163 is provided on an outer surface of the conductor layer 162. A first end surface 110e-side end surface of the cathode lead-out layer 163 may be covered with the third plating film described above.

The conductor layers 162 of the capacitor elements 170B adjacent to each other in the lamination direction are electrically connected to each other via the cathode lead-out layer 163. The width of the cathode lead-out layer 163 in the width direction W is the same as the width of the metal layer 141 in the width direction W, for example.

The cathode lead-out layer 163 can be made of metal foil or a printed electrode layer.

In the case of metal foil, preferably, it is made of at least one metal selected from the group consisting of Al, Cu, Ag, and an alloy mainly containing any of these metals. The metal foil may be one coated with carbon or titanium by a film formation method such as surface sputtering or deposition. In particular, use of aluminum foil coated with carbon is preferred.

In the case of a printed electrode layer, an electrode paste is applied to the conductive layer by sponge transfer, screen printing, spray coating, dispensing, inkjet printing, or the like, whereby the cathode lead-out layer can be formed in a predetermined area. Preferably, the electrode paste is one mainly containing Ag, Cu, or Ni. When the cathode lead-out layer is made of a printed electrode layer, the cathode lead-out layer can be made thinner than when it is made of metal foil.

The first external electrode 120A is directly or indirectly connected to each cathode lead-out layer 163 at the first end surface 110e of the insulating resin body 110A.

The second external electrode 130A is directly or indirectly connected to each metal layer 141 of the multiple capacitor elements 170B at the second end surface 110f of the insulating resin body 110A.

Method of Producing Solid Electrolytic Capacitor

The solid electrolytic capacitor 100A shown in FIG. 4 and FIG. 5 is produced as follows, for example.

The method of producing the solid electrolytic capacitor 100A is different from the method of producing the solid electrolytic capacitor 100 in the following points: step S20A of providing the capacitor elements 170A inside the insulating resin body 110A is different; and steps S31 to S36 are included instead of the above-described step S30.

In producing the solid electrolytic capacitor 100A, the capacitor element 170A is prepared in step S10 as in the first embodiment. Specifically, steps S11 to S14 are performed as in the first embodiment.

Next, in step S20A, multiple such capacitor elements 170A are provided inside the insulating resin body 110A. Specifically, the following steps S21A and S23A are performed.

In step S21A, the multiple capacitor elements 170A are stacked on the substrate 111. Specifically, the multiple capacitor elements 170A are stacked on the substrate 111 to which the lead-out conductor layer 180 is provided. At this point, using a conductive adhesive such as a Ag paste, the conductor layer 162 of one capacitor element 170A is connected to the lead-out conductor layer 180, and also, the conductor layers 162 of the capacitor elements 170A adjacent to each other are connected to each other. Preferably, the lead-out conductor layer 180 is blackened. Subsequently, the substrate 111 and the capacitor elements 170A are bonded by thermal compression. The conductive adhesive is thermally cured into the connecting conductor layers 190.

In step S23A, the multiple capacitor elements 170A are molded using an insulating resin such as an epoxy resin. Specifically, using the molding process, the substrate 111 is mounted on an upper mold, the upper mold and a lower mold are clamped together, with an insulating resin such as an epoxy resin being melted by heat in a cavity of the lower mold, and the insulating resin is solidified, whereby the mold portion 112 is formed.

Subsequently, in step S31, the substrate 111 and the capacitor elements 170A are cut such that they are cut at the masked portion formed in step S12. Specifically, the substrate 111 and the capacitor elements 170A in the molded state are cut by pressing, dicing, or laser cutting. Chips each including the insulating resin body 110A are formed by this step.

In step S32, the chips are barrel polished. Specifically, the chips are enclosed with an abrasive in a small container called a barrel, and the barrel is rotated, whereby the chips are polished. In this manner, the corners and ridges of the chips are rounded.

In step S33, end surfaces of the metal layers 141 exposed from end surfaces of the chips are plated. Specifically, the oil content is removed from each chip by an alkaline treating agent. An oxide film on the end surface of each metal layer 141 is removed by alkaline etching. Smut on the end surface of each metal layer 141 is removed by desmutting. A zincate treatment is performed to deposit Zn by replacement, and a first plating film is formed on the end surface of each metal layer 141. Then, electroless Ni plating is performed to form a second plating film on each first plating film. At this point, a third plating film is formed on the end surface of the lead-out conductor layer 180.

In step S34, a conductivity-imparting liquid is attached to both ends of each chip. Specifically, parts excluding both ends of each chip are masked. Each chip is degreased with a surfactant in order to improve the wettability of the conductivity-imparting liquid relative to the surfaces of both ends of the chip and also to allow conductive particles in the conductivity-imparting liquid to be easily adsorbed onto both ends of the chip. Any of anionic, cationic, amphoteric, and nonionic surfactants is selected according to the type of the conductivity-imparting liquid and used as a conditioner having a degreasing effect.

In the present embodiment, the conductive particles in the conductivity-imparting liquid contain Pd as a catalytic metal that serves as a plating core, but there are no limitations on the conductive particles as long as they contain at least one metal selected from the group consisting of Pd, Sn, Ag, and Cu. The conductivity-imparting liquid is a solution containing ions of any of the above metals or a colloidal solution of any of the above metals.

Each chip with the conductivity-imparting liquid attached to both ends thereof is washed with water or a solvent, and then dried, whereby conductive films are formed on both ends of the chip. In this manner, multiple conductive particles are present on each of the first end surface 110e and the second end surface 110f of the insulating resin body 110A. The chip including conductive films at both ends thereof may be micro-etched to roughen surfaces of both ends of the chip.

In step S35, both ends of the chip are plated to form the first external electrode 120A and the second external electrode 130A. Specifically, electroplating is performed to form a Cu plating layer on the conductive film on each end of the chip. The Cu plating layer is formed with the conductive particles attached to both ends of the chip as cores. A Ni plating layer is formed on the Cu plating layer by electroplating. Subsequently, a Sn plating layer is formed on the Ni plating layer by electroplating.

In step S36, the gas barrier film 200 having a water vapor transmittance of 1 g/m$^2$ per day or less is formed on the outer surface of the insulating resin body 110A. At this point, the parts where the first external electrode 120A and the second external electrode 130A are formed are masked.

The gas barrier film 200 may be formed before forming the first external electrode 120A and the second external electrode 130A.

The solid electrolytic capacitor 100A is produced by the above steps.

In producing the solid electrolytic capacitor 100B shown in FIG. 6, each capacitor element 170B may be prepared by providing the cathode lead-out layer 163 on the outer surface of the conductor layer 162 after step S14.

The electrolytic capacitor of the present invention is not limited to the above embodiments, and various modifications and changes can be made to the structure of the electrolytic capacitor, production conditions, and the like within the scope of the present invention.

EXAMPLES

The following describes examples that more specifically disclose the electrolytic capacitor of the present invention. The present invention is not limited to these examples.

Production of Solid Electrolytic Capacitor

Examples 1 to 5

In each of these examples, the corresponding gas barrier film 200 shown in Table 1 was formed on the outer surface of the insulating resin body 110 of the solid electrolytic capacitor 100 configured as shown in FIG. 1.

Gas barrier films having a thickness of 300 nm made of DLC in Example 1 and $SiO_2$ in Example 2 were formed by the plasma CVD method.

A gas barrier film having a thickness of 300 nm made of $Al_2O_3$ in Example 3 was formed by the ALD method.

A gas barrier film made of a polysilazane in Example 4 was formed by dip coating with TRESMILE ANL120A-20 (available from Sanwa Kagaku Corp.), followed by drying and curing at 150° C. for 30 minutes.

A gas barrier film made of polysiloxane in Example 5 was formed by dip coating with Protector S-6140 (available from Okuno Chemical Industries Co., Ltd.), followed by drying and curing at 150° C. for 30 minutes.

Comparative Example 1

No gas barrier film 200 was formed on the outer surface of the insulating resin body 110 of the solid electrolytic capacitor 100 configured as shown in FIG. 1.

Evaluation of Solid Electrolytic Capacitor

For Examples 1 to 5 and Comparative Example 1, 1000-hour moisture resistance tests were performed at 85° C., 85% RH, and 16 V. The equivalent series resistance (ESR) was measured before and after each moisture resistance test, and the rate of change of ESR was evaluated. The rate of change of ESR was calculated by (ESR after moisture resistance test)/(ESR before moisture resistance test). Table 1 shows the results.

TABLE 1

| | | ESR (mΩ) | | |
| --- | --- | --- | --- | --- |
| | Gas barrier film | Before moisture resistance test | After moisture resistance test | Rate of change of ESR |
| Comparative Example 1 | Not formed | 38.8 | 69.6 | 1.79 |
| Example 1 | DLC | 43.5 | 49.5 | 1.14 |

TABLE 1-continued

|  | Gas barrier film | ESR (mΩ) Before moisture resistance test | ESR (mΩ) After moisture resistance test | Rate of change of ESR |
|---|---|---|---|---|
| Example 2 | $SiO_2$ | 40.9 | 48.5 | 1.19 |
| Example 3 | $Al_2O_3$ | 39.9 | 47.6 | 1.19 |
| Example 4 | Polysilazane | 45.1 | 52.5 | 1.16 |
| Example 5 | Polysiloxane | 36.4 | 48.4 | 1.33 |

As shown in Table 1, in Examples 1 to 5 each in which the gas barrier film was formed on the outer surface of the insulating resin body, the rate of change of ESR was lower than that in Comparative Example 1 in which no gas barrier film was formed. The results of Table 1 indicate that the gas barrier film on the outer surface of the insulating resin body improves the moisture resistance reliability because it reduces or prevents water vapor transmission through the capacitor elements.

Production of Solid Electrolytic Capacitor

Example 6

A corona discharge treatment with gas plasma was performed, as a pre-treatment of the gas barrier film 200 formation, on the outer surface of the insulating resin body 110 of the solid electrolytic capacitor 100 configured as shown in FIG. 1. Subsequently, as in Example 5, the gas barrier film 200 was formed by dip coating with Protector S-6140 (available from Okuno Chemical Industries Co., Ltd.), followed by drying and curing at 150° C. for 30 minutes.

Evaluation of Solid Electrolytic Capacitor

For Examples 5 and 6, whether or not the gas barrier film was peeled off after reflow was evaluated. Specifically, in each of these examples, 20 samples were mounted on a glass epoxy substrate, and were reflow soldered. Then, the appearance of each sample and a polished surface of an LT cross section of the sample were observed with a stereomicroscope to see whether or not the gas barrier film was peeled off. Table 2 shows the results.

TABLE 2

|  | Gas barrier film | Corona discharge treatment | Number of barrier films peeled off after reflow |
|---|---|---|---|
| Example 5 | Polysiloxane | Not performed | 16/20 |
| Example 6 | Polysiloxane | Performed | 0/20 |

As shown in Table 2, in Example 5 in which no corona discharge treatment was performed, peeling of the gas barrier films due to high temperatures during reflow was observed. In contrast, in Example 6 in which the corona discharge treatment was performed, no peeling of the gas barrier films was observed. The results of Table 2 indicate that the corona discharge treatment as a pre-treatment improves the reflow resistance because it improves the adhesion between the epoxy resin of the insulating resin body and the gas barrier film.

The effect of the corona discharge treatment is exerted not only on the gas barrier film made of polysiloxane but also on other gas barrier films.

In addition, the effect of the gas barrier film is exerted not only on the solid electrolytic capacitor 100 shown in FIG. 1 but also on other solid electrolytic capacitors such as the solid electrolytic capacitor 100A shown in FIG. 4 and on electrolytic capacitors other than the solid electrolytic capacitors.

REFERENCE SIGNS LIST

100, 100A, 100B solid electrolytic capacitor
110, 110A insulating resin body
110a first main surface
110b second main surface
110c first side surface
110d second side surface
110e first end surface
110f second end surface
111 substrate
112 mold portion
120 first terminal
120A first external electrode
130 second terminal
130A second external electrode
140, 140A anode portion
141 metal layer
150 dielectric layer
151 insulating layer
160, 160A cathode portion
161 solid electrolyte layer
162 conductor layer
163 cathode lead-out layer
170, 170A, 170B capacitor element
180 lead-out conductor layer
190 connecting conductor layer
200 gas barrier film

The invention claimed is:

1. An electrolytic capacitor comprising:
    a capacitor element including an anode portion made of a metal layer, a dielectric layer on an outer surface of the metal layer, and a cathode portion on an outer surface of the dielectric layer;
    an insulating resin body covering the capacitor element, wherein an outer surface of the insulating resin body is a corona discharge treated surface; and
    a gas barrier film on the outer surface of the insulating resin body, the gas barrier film having a water vapor transmittance of 1 $g/m^2$ per day or less.

2. The electrolytic capacitor according to claim 1, wherein the gas barrier film is made of at least one selected from diamond-like carbon, $SiO_2$, and $Al_2O_3$.

3. The electrolytic capacitor according to claim 1, wherein the gas barrier film is made of at least two selected from diamond-like carbon, $SiO_2$ and $Al_2O_3$.

4. The electrolytic capacitor according to claim 1, wherein the gas barrier film is made of diamond-like carbon.

5. The electrolytic capacitor according to claim 1, wherein the gas barrier film is made of $SiO_2$.

6. The electrolytic capacitor according to claim 1, wherein the gas barrier film is made of $Al_2O_3$.

7. The electrolytic capacitor according to claim 1, wherein the insulating resin body comprises an epoxy resin.

8. The electrolytic capacitor according to claim 1, wherein the gas barrier film is on an entire outer surface of the insulating resin body.

9. The electrolytic capacitor according to claim 1, further comprising:
    a first external terminal electrically connected to the cathode portion and projecting externally from the insulating resin body; and a second external terminal electrically connected to the anode portion and projecting externally from the insulating resin body.

10. The electrolytic capacitor according to claim 9, wherein the gas barrier film is on an entire outer surface of the insulating resin body other than portions of the first and second external terminals that project externally from the insulating resin body.

11. The electrolytic capacitor according to claim 1, further comprising:
   a first external electrode on the outer surface of the insulating resin body and electrically connected to the cathode portion; and
   a second external electrode on the outer surface of the insulating resin body and electrically connected to the anode portion.

12. The electrolytic capacitor according to claim 11, wherein the gas barrier film is on a part of the outer surface of the insulating resin body where the first and second external electrodes are not present.

13. The electrolytic capacitor according to claim 11, wherein the insulating resin body includes:
   a substrate; and
   a mold portion on the substrate and covering the capacitor element.

\* \* \* \* \*